(12) United States Patent
Szarzynski

(10) Patent No.: US 9,048,779 B2
(45) Date of Patent: Jun. 2, 2015

(54) MULTI-DIMENSIONAL POSITIONING OF AN OBJECT

(71) Applicant: Randall Lee Szarzynski, Oxnard, CA (US)

(72) Inventor: Randall Lee Szarzynski, Oxnard, CA (US)

( * ) Notice: Subject to any disclaimer, the term of this patent is extended or adjusted under 35 U.S.C. 154(b) by 76 days.

(21) Appl. No.: 13/866,842

(22) Filed: Apr. 19, 2013

(65) Prior Publication Data

US 2014/0312808 A1 Oct. 23, 2014

(51) Int. Cl.
*B65H 59/38* (2006.01)
*H02P 31/00* (2006.01)

(52) U.S. Cl.
CPC ..................... *H02P 31/00* (2013.01)

(58) Field of Classification Search
USPC ........ 318/6, 7, 560, 648, 649; 248/49, 58, 59; 396/5, 419, 425, 428; 104/112, 116, 104/117, 173.1, 178, 180, 215, 240
See application file for complete search history.

(56) References Cited

U.S. PATENT DOCUMENTS

| | | | | |
|---|---|---|---|---|
| 4,625,938 | A * | 12/1986 | Brown | ........................... 248/550 |
| 4,980,519 | A | 12/1990 | Mathews | |
| 5,224,426 | A * | 7/1993 | Rodnunsky et al. | ........... 104/112 |
| 5,585,707 | A * | 12/1996 | Thompson et al. | ......... 318/568.2 |
| 5,703,623 | A | 12/1997 | Hall et al. | |
| 5,932,397 | A | 8/1999 | Mustacich | |
| 6,404,416 | B1 | 6/2002 | Kahn et al. | |
| 6,412,363 | B1 | 7/2002 | Brogardh | |
| 6,566,834 | B1 * | 5/2003 | Albus et al. | ................. 318/568.2 |
| 6,704,000 | B2 | 3/2004 | Carpenter | |
| 6,809,495 | B2 * | 10/2004 | Rodnunsky | .................... 318/649 |
| 7,061,468 | B2 | 6/2006 | Tiphane et al. | |
| 7,753,642 | B2 * | 7/2010 | Bosscher et al. | .............. 414/735 |
| 7,859,523 | B2 | 12/2010 | Kong | |
| 8,118,987 | B2 | 2/2012 | Jayaraman | |
| 8,251,597 | B2 * | 8/2012 | Dougherty et al. | ........... 396/428 |
| 2004/0206715 | A1 | 10/2004 | Rodnunsky | |
| 2005/0024004 | A1 | 2/2005 | Rodnunsky | |
| 2005/0024331 | A1 | 2/2005 | Berkley et al. | |
| 2005/0087089 | A1 | 4/2005 | Rodnunsky | |
| 2005/0216867 | A1 | 9/2005 | Marvit et al. | |

(Continued)

FOREIGN PATENT DOCUMENTS

| | | |
|---|---|---|
| EP | 2578367 A1 | 4/2013 |
| EP | 2578367 B1 * | 4/2014 |
| JP | 07-141099 A | 6/1995 |

OTHER PUBLICATIONS

IPA320, IPAnema—A high dynamic parallel cable robot, http://www.youtube.com/watch?v=RCa8uDFzbsw&feature=youtu.be, Nov. 3, 2009, pp. 1-3.

(Continued)

*Primary Examiner* — Bentsu Ro
*Assistant Examiner* — Thai Dinh
(74) *Attorney, Agent, or Firm* — Lyon & Harr, LLP; Richard T. Lyon

(57) ABSTRACT

Apparatuses for positioning and moving an object are provided. One apparatus positions/moves the object within a two-dimensional space having the shape of a convex polygon. Another apparatus positions/moves the object within a three-dimensional space having the shape of a convex polyhedron. Yet another apparatus separately positions/moves two different attachment points on the object within the bounds of the lateral faces of a three-dimensional space having the shape of a convex prism.

25 Claims, 5 Drawing Sheets

(56) References Cited

U.S. PATENT DOCUMENTS

2006/0275030 A1 12/2006 Rodnunsky
2007/0056463 A1 3/2007 Rodnunsky
2007/0152141 A1 7/2007 Rodnunsky
2008/0054836 A1 3/2008 Rodnunsky et al.
2009/0066100 A1 3/2009 Bosscher et al.
2009/0301814 A1 12/2009 Rodnunsky

OTHER PUBLICATIONS

Search Report Received in PCT Patent Application No. PCT/US2014/033569, Mailed Date: Sep. 22, 2013, 14 pages.

* cited by examiner

MULTI-DIMENSIONAL POSITIONING OF AN OBJECT

BACKGROUND

Systems that facilitate the positioning and movement of a payload within a defined space are used in a wide variety of applications. For example, aerial cabling systems are used in the field of photography and in the motion picture industry to move a camera across a scene and position the camera at desired locations within the scene. Aerial cabling systems are also used at indoor sporting events to move a camera across a playing field and position the camera at desired locations within the playing field. Aerial cabling systems are also used in manufacturing, construction, and other materials management industries to hoist and transfer various types of materials from one point to another within a defined space.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Object positioner embodiments described herein generally involve an apparatus for positioning and moving an object. In one exemplary embodiment the apparatus includes a structure that establishes a number of vertices which define an empty two-dimensional (2D) space having the shape of a convex polygon, where this number is greater than or equal to three. The apparatus also includes the same number of line guiding devices, the same number of line displacement actuators, and the same number of connecting lines. Each of the line guiding devices is disposed at the location of a different one of the vertices. One end of each of the connecting lines is attached to a different one of the line displacement actuators. Each of the connecting lines is reeved to a different one of the line guiding devices. The other end of each of the connecting lines is attached to the object. Each of the line displacement actuators is selectively operated to displace the connecting line that is attached to the line displacement actuator in a controlled manner in order to achieve a desired positioning or movement of the object within the 2D space. Each of the line displacement actuators maintains a prescribed amount of tension on the connecting line that is attached to the line displacement actuator when this line is being displaced, and when the displacement of this line is fixed.

In another exemplary embodiment the apparatus includes a structure that establishes a number of vertices which define an empty three-dimensional (3D) space having the shape of a convex polyhedron, where this number is greater than or equal to four. The apparatus also includes the same number of line guiding devices, the same number of line displacement actuators, and the same number of connecting lines. Each of the line guiding devices is disposed at the location of a different one of the vertices. One end of each of the connecting lines is attached to a different one of the line displacement actuators. Each of the connecting lines is reeved to a different one of the line guiding devices. The other end of each of the connecting lines is attached to the object. Each of the line displacement actuators is selectively operated to displace the connecting line that is attached to the line displacement actuator in a controlled manner in order to achieve a desired positioning or movement of the object within the 3D space. Each of the line displacement actuators maintains a prescribed amount of tension on the connecting line that is attached to the line displacement actuator when this line is being displaced, and when the displacement of this line is fixed.

In yet another exemplary embodiment the apparatus includes a number of longitudinal support members that establish the lateral edges of an empty 3D space having the shape of a convex prism and also partially establish the corresponding lateral faces of the 3D space, where this number is greater than or equal to three. The apparatus also includes the same number of upper line guiding devices, each of which is disposed on a different one of the support members. The apparatus also includes the same number of lower line guiding devices, each of which is disposed on a different one of the support members beneath the upper line guiding device that is disposed thereon. The apparatus also includes the same number of upper line displacement actuators, the same number of lower line displacement actuators, the same number of upper connecting lines, and the same number of lower connecting lines. One end of each of the upper connecting lines is attached to a different one of the upper line displacement actuators. Each of the upper connecting lines is reeved to a different one of the upper line guiding devices. The other end of each of the upper connecting lines is attached to an upper attachment point on the object. Each of the upper line displacement actuators is selectively operated to displace the upper connecting line that is attached thereto in a controlled manner in order to achieve a desired positioning or movement of the upper attachment point on the object within the bounds of the lateral faces. Each of the upper line displacement actuators maintains a first prescribed amount of tension on the upper connecting line that is attached thereto when this line is being displaced, and when the displacement of this line is fixed. One end of each of the lower connecting lines is attached to a different one of the lower line displacement actuators. Each of the lower connecting lines is reeved to a different one of the lower line guiding devices. The other end of each of the lower connecting lines is attached to a lower attachment point on the object. Each of the lower line displacement actuators is selectively operated to displace the lower connecting line that is attached thereto in a controlled manner in order to achieve a desired positioning or movement of the lower attachment point on the object within the bounds of the lateral faces. Each of the lower line displacement actuators maintains a second prescribed amount of tension on the lower connecting line that is attached thereto when this line is being displaced, and when the displacement of this line is fixed.

DESCRIPTION OF THE DRAWINGS

The specific features, aspects, and advantages of the object positioner embodiments described herein will become better understood with regard to the following description, appended claims, and accompanying drawings where:

DETAILED DESCRIPTION

Figure 1:
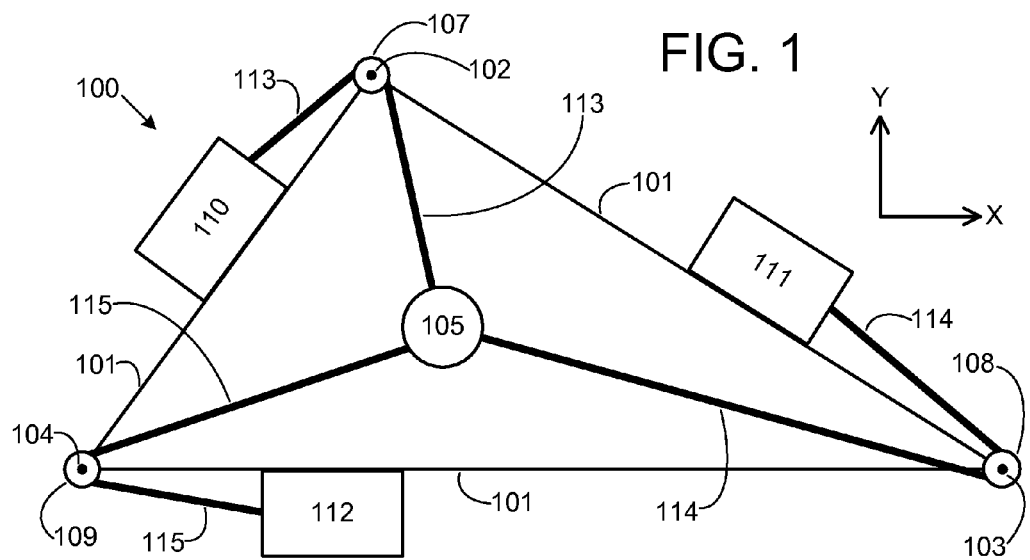
FIG. 1 is a diagram illustrating a plan view, in simplified form, of a two-dimensional (2D) embodiment of the object positioner described herein that positions and moves an object within a 2D space having the shape of a triangle.

In the following description of object positioner embodiments reference is made to the accompanying drawings which form a part hereof, and in which are shown, by way of illustration, specific embodiments in which the object positioner can be practiced. It is understood that other embodiments can be utilized and structural changes can be made without departing from the scope of the object positioner embodiments.

It is also noted that for the sake of clarity specific terminology will be resorted to in describing the object positioner embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the object positioner. The appearances of the phrases "in one embodiment", "in another embodiment", "in an exemplary embodiment", "in an alternate embodiment", "in one implementation", "in another implementation", "in an exemplary implementation", and "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the object positioner does not inherently indicate any particular order not imply any limitations of the object positioner.

The term "connecting line" is used herein to refer to a linear and flexible connecting device having a prescribed tensile strength (e.g., a cable) that is used to move and support (e.g., maintain the positioning of) an object. The object positioner embodiments described herein can use a wide variety of types of connecting lines. By way of example but not limitation, each of the connecting lines described herein can be either a string, or a rope, or a metallic wire, or a nylon line, or a chain.

1.0 Multi-Dimensional Positioning of an Object

The object positioner embodiments described herein generally provide for the multi-dimensional positioning and movement of an object. In other words and as will be described in more detail hereafter, the object positioner embodiments generally facilitate the positioning and controlled movement of an object within either a prescribed two-dimensional (2D) space (e.g., a prescribed planar area), or a prescribed three-dimensional (3D) space (e.g., a prescribed volume of space).

The object positioner embodiments described herein are advantageous for various reasons including, but not limited to, the following. Generally speaking, and as will be appreciated from the more detailed description that follows, the object positioner embodiments can position and move an object within many different types of 2D spaces and many different types of 3D spaces. The object positioner embodiments can also be scaled to support many different sizes of 2D spaces and many different sizes of 3D spaces, ranging from very small to very large 2D and 3D spaces. The object positioner embodiments can also precisely and reproducibly position an object at various desired points within either a prescribed 2D space or a prescribed 3D space. The object positioner embodiments can also controllably and reproducibly move an object at a desired speed, or according to a desired speed profile that operates within a prescribed range of speeds, along various desired paths between two desired points within either a prescribed 2D space or a prescribed 3D space. The object positioner embodiments also have a simple design and construction which makes the embodiments reliable and easy to service/maintain.

Additionally, the object positioner embodiments described herein can generally be scaled to support the positioning and movement of any type of payload (e.g., any type of object). More particularly, the object positioner embodiments can position and move objects having a wide variety of sizes and masses. The object positioner embodiments can also position and move either non-powered objects (e.g., objects that do not operate from an electrical power source), or internally-powered objects (e.g., objects that operate from an internal electrical power source such as batteries or a solar cell, among other things), or externally-powered objects (e.g., objects that operate from an external electrical power source such as alternating current (AC) power source or a direct current (DC) power source, among other things). The object positioner embodiments can also position and move either internally-controlled objects (e.g., an object whose functional operation is managed by a controller that is integrated with the object) or externally-controlled objects (e.g., an object whose functional operation is managed by a controller that is located remotely from the object, where this controller can communicate control signals and/or commands to the object either wirelessly or via wires that are connected to the object, among other ways).

Given the foregoing, it will be appreciated the object positioner embodiments described herein can position and move many different types of useful objects that provide utility in many different types of industries. By way of example but not limitation, in one implementation of the object positioner embodiments the object being positioned and moved is an image sensing device (such as a video camera, or the like) that can be used in the motion picture and video production industries, among others. In another implementation of the object positioner embodiments the object being positioned and moved is a painting device (such as a paint sprayer, or the like) that can be used in the commercial painting or artwork industries, among others. In yet another implementation of the object positioner embodiments the object being positioned and moved is any of a variety of other types of end effectors (such as a gripping device, or a laser, or a spot welding device, or the like) that are used in the robotics and manufacturing automation industries, among others.

1.1 Two-Dimensional (2D) Positioning of an Object

This section describes exemplary embodiments of the object positioner described herein that provide for direct 2D control of the positioning and movement of an object. These particular object positioner embodiments are hereafter collectively simply referred to as 2D positioner embodiments. Generally speaking and as will be appreciated from the more detailed description that follows, the 2D positioner embodiments described herein directly control the positioning and movement of an object in two dimensions along a first degree of freedom (e.g., an X-axis) and a second degree of freedom (e.g., a Y-axis). The 2D positioner embodiments thus allow the object to be positioned and moved in a controlled manner within a prescribed 2D space.

In the exemplary embodiments of the 2D positioner described herein the 2D space within which the object is being positioned and moved can be any type of 2D space having the shape of a convex polygon. In other words, the 2D space can be any type of polygon-shaped space having three or more vertices, where the interior angles of the polygon-shaped space are all less than 180 degrees. More particularly and by way of example but not limitation, in one embodiment of the 2D positioner the 2D space has the shape of any type of triangle (e.g. the 2D space is defined by three vertices and three edges). In another embodiment of the 2D positioner the 2D space has the shape of any type of convex quadrilateral (e.g., the 2D space is defined by four vertices and four edges, where each of the interior angles of this space is less than 180 degrees). In yet another embodiment of the 2D positioner the 2D space has the shape of any type of convex pentagon (e.g., the 2D space is defined by five vertices and five edges, where each of the interior angles of this space is less than 180 degrees). In yet another embodiment of the 2D positioner the 2D space has the shape of any type of convex hexagon (e.g., the 2D space is defined by six vertices and six edges, where each of the interior angles of this space is less than 180 degrees).

A 2D coordinate system can be used to specifically and completely identify the current position and a desired new position of the object within the 2D space. It will be appreciated that various types of 2D coordinate systems can be used in the 2D positioner embodiments described herein. By way of example but not limitation, in one implementation of the 2D positioner embodiments the 2D coordinate system that is used is the conventional Cartesian coordinate system, and the current and desired new positions of the object are identified by coordinates that specify the conventional ordered pair of numbers (x,y). In another implementation of the 2D positioner embodiments the 2D coordinate system that is used is the conventional polar coordinate system, and the current and desired new positions of the object are identified by coordinates that specify the conventional ordered pair of numbers $(r,\theta)$.

FIG. 1 illustrates a plan view, in simplified form, of a triangular embodiment of the 2D positioner described herein. In other words, FIG. 1 illustrates a plan view, in simplified form, of an apparatus 100 for positioning and moving an object 105 within a 2D space having the shape of a triangle. As exemplified in FIG. 1, the apparatus 100 includes a structure 101 that establishes three vertices 102-104 which define an empty triangle-shaped space. The apparatus 100 also includes three line guiding devices 107-109 each of which is disposed at the location of a different one of the vertices 102-104 (e.g., line guiding device 107 is disposed at the location of vertex 102). The apparatus 100 also includes three line displacement actuators 110-112 and three connecting lines 113-115, where one end of each of the connecting lines is attached to a different one of the actuators (e.g., one end of connecting line 113 is attached to actuator 110), each of the connecting lines is reeved (e.g., movably coupled) to a different one of the line guiding devices (e.g., connecting line 113 is reeved to line guiding device 107), and the other end of each of the connecting lines is attached to the object 105. In other words, each of the line guiding devices 107-109 is configured to capture and guide a given connecting line 113-115 that is reeved thereto, and causes the connecting line to change direction when it is tensioned (e.g., line guiding device 107 captures and guides connecting line 113 and causes it to change direction when it is tensioned).

Given the foregoing and referring again to FIG. 1, it will be appreciated that each of the connecting lines 113-115 is configured to pull the object 105 in a different direction. More particularly, connecting line 113 is configured to pull the object 105 toward line guiding device 107. Connecting line 114 is configured to pull the object 105 toward line guiding device 108. Connecting line 115 is configured to pull the object 105 toward line guiding device 109.

As will be described in more detail hereafter and referring again to FIG. 1, the line displacement actuators 110-112 operate in a coordinated manner to achieve a desired positioning or movement of the object 105 within the empty triangle-shaped space that is defined by the three vertices 102-104. In other words, each of the actuators 110-112 is selectively operated to displace the connecting line 113-115 that is attached to the actuator in a controlled manner, where a given connecting line displacement can involve either retracting the line a desired amount (such that the length of the line within the triangle-shaped space is decreased by this amount), or extending the line another desired amount (such that the length of the line within the triangle-shaped space is increased by this amount). Each of the actuators 110-112 also maintains a prescribed amount of tension on the connecting line 113-115 that is attached to the actuator when this line is being displaced (e.g., the object is being moved), and when the displacement of this line is fixed (e.g., the line displacement is static). More particularly, actuator 110 can displace connecting line 113 in a controlled manner, and also maintains the prescribed amount of tension on line 113 when line 113 is being displaced, and when the displacement of line 113 is fixed. Actuator 111 can displace connecting line 114 in a controlled manner, and also maintains the prescribed amount of tension on line 114 when line 114 is being displaced, and when the displacement of line 114 is fixed. Actuator 112 can displace connecting line 115 in a controlled manner, and also maintains the prescribed amount of tension on line 115 when line 115 is being displaced, and when the displacement of line 115 is fixed.

Referring again to FIG. 1, the line displacement actuators 110-112 operate under the centralized control of an actuator controller (not shown). The actuator controller coordinates the operation of the different actuators 110-112 to achieve a desired positioning or movement of the object 105. More particularly, the actuator controller can use the aforementioned 2D coordinate system to keep track of the coordinates of the current position of the object 105 within the empty triangle-shaped space that is defined by the three vertices 102-104, and specify the coordinates of a desired new position for the object within this space. The actuator controller can then use this knowledge of the coordinates of the current position of the object 105 and the coordinates of the desired new position for the object to calculate the amount each of the connecting lines 113-115 is to be displaced in order to move the object from its current position to the desired new position. A positive calculated amount can mean that a given connecting line is to be extended and a negative calculated amount can mean that the line is to be retracted, or vice versa. It will be appreciated that the actuator controller can retract just one of the connecting lines, in which case the other two connecting lines would be extended. The actuator controller can also retract a given pair of connecting lines, in which case the third connecting line that is not part of the pair would be extended.

Figure 2:
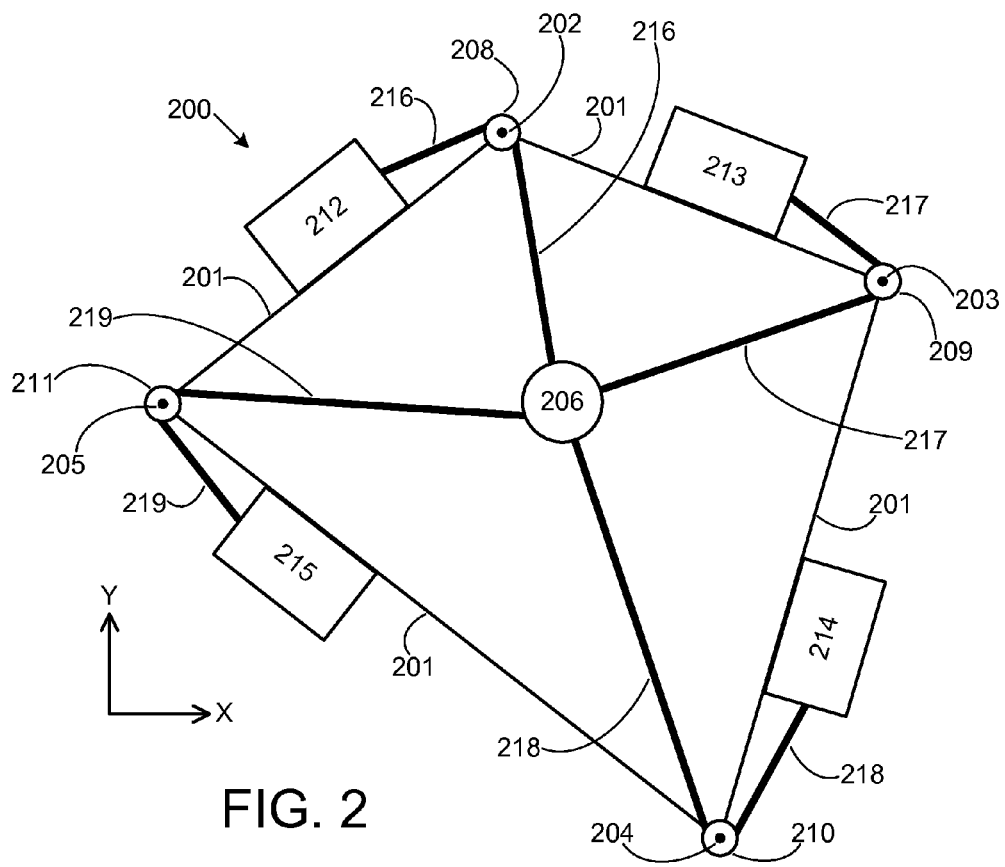
FIG. 2 is a diagram illustrating a plan view, in simplified form, of another 2D embodiment of the object positioner described herein that positions and moves an object within a 2D space having the shape of a convex quadrilateral.

FIG. 2 illustrates a plan view, in simplified form, of a convex quadrilateral embodiment of the 2D positioner described herein. In other words, FIG. 2 illustrates a plan view, in simplified form, of an apparatus 200 for positioning and moving an object 206 within a 2D space having the shape of a convex quadrilateral. As exemplified in FIG. 2, the apparatus 200 includes a structure 201 that establishes four vertices 202-205 which define an empty quadrilateral-shaped space. The apparatus 200 also includes four line guiding devices 208-211 each of which is disposed at the location of a different one of the vertices 202-205 (e.g., line guiding device 208 is disposed at the location of vertex 202). The apparatus 200 also includes four line displacement actuators 212-215 and four connecting lines 216-219, where one end of each of the connecting lines is attached to a different one of the actuators (e.g., one end of connecting line 216 is attached to actuator 212), each of the connecting lines is reeved to a different one of the line guiding devices (e.g., connecting line 216 is reeved to line guiding device 208), and the other end of each of the connecting lines is attached to the object 206. In other words, each of the line guiding devices 208-211 is configured to capture and guide a given connecting line 216-219 that is reeved thereto, and causes the connecting line to change direction when it is tensioned (e.g., line guiding device 208 captures and guides connecting line 216 and causes it to change direction when it is tensioned).

Given the foregoing and referring again to FIG. 2, it will be appreciated that each of the connecting lines 216-219 is configured to pull the object 206 in a different direction. More particularly, connecting line 216 is configured to pull the object 206 toward line guiding device 208. Connecting line 217 is configured to pull the object 206 toward line guiding device 209. Connecting line 218 is configured to pull the object 206 toward line guiding device 210. Connecting line 219 is configured to pull the object 206 toward line guiding device 211.

As will be described in more detail hereafter and referring again to FIG. 2, the line displacement actuators 212-215 operate in a coordinated manner to achieve a desired positioning or movement of the object 206 within the empty convex quadrilateral-shaped space that is defined by the four vertices 202-205. In other words, each of the actuators 212-215 is selectively operated to displace the connecting line 216-219 that is attached to the actuator in a controlled manner, where a given connecting line displacement can involve either retracting the line a desired amount (such that the length of the line within the convex quadrilateral-shaped space is decreased by this amount), or extending the line another desired amount (such that the length of the line within the convex quadrilateral-shaped space is increased by this amount). Each of the actuators 212-215 also maintains a prescribed amount of tension on the connecting line 216-219 that is attached to the actuator when this line is being displaced, and when the displacement of this line is fixed. More particularly, actuator 212 can displace connecting line 216 in a controlled manner, and also maintains the prescribed amount of tension on line 216 when line 216 is being displaced, and when the displacement of line 216 is fixed. Actuator 213 can displace connecting line 217 in a controlled manner, and also maintains the prescribed amount of tension on line 217 when line 217 is being displaced, and when the displacement of line 217 is fixed. Actuator 214 can displace connecting line 218 in a controlled manner, and also maintains the prescribed amount of tension on line 218 when line 218 is being displaced, and when the displacement of line 218 is fixed. Actuator 215 can displace connecting line 219 in a controlled manner, and also maintains the prescribed amount of tension on line 219 when line 219 is being displaced, and when the displacement of line 219 is fixed.

Referring again to FIG. 2, the line displacement actuators 212-215 operate under the centralized control of an actuator controller (not shown). The actuator controller coordinates the operation of the different actuators 212-215 to achieve a desired positioning or movement of the object 206. More particularly, the actuator controller can use the aforementioned 2D coordinate system to keep track of the coordinates of the current position of the object 206 within the empty convex quadrilateral-shaped space that is defined by the four vertices 202-205, and specify the coordinates of a desired new position for the object within this space. The actuator controller can then use this knowledge of the coordinates of the current position of the object 206 and the coordinates of the desired new position for the object to calculate the amount each of the connecting lines 216-219 is to be displaced in order to move the object from its current position to the desired new position. It will be appreciated that various connecting line displacement scenarios are possible, each of which depends on the particular current position of the object and the particular desired new position for the object. In one exemplary scenario the actuator controller can retract just one of the connecting lines, and the other three connecting lines can be extended. In another exemplary scenario the actuator controller can retract a given pair of connecting lines that are reeved to line guiding devices which are adjacent to each other on the structure 201 (e.g., connecting lines 216 and 217), and the other two connecting lines that are not part of the pair (e.g., connecting lines 218 and 219) can be extended. In yet another exemplary scenario the actuator controller can retract a given triple of connecting lines, and the fourth connecting line that is not part of the triple can be extended.

The 2D positioner embodiments described herein can use various types of connecting lines examples of which have been provided heretofore. The particular type of connecting line that is used in a given embodiment of the 2D positioner can be determined based on various factors such as the size of the 2D space within which the object is being positioned and moved, and the mass of the object, among other factors. Regarding the prescribed amount of tension that each of the line displacement actuators maintains on the connecting line that is attached to the actuator, in one implementation of the 2D positioner embodiments the prescribed amount of tension is a target tension value. In another implementation of the 2D positioner embodiments the prescribed amount of tension is a range of tension values.

The 2D positioner embodiments described herein can use various types of line guiding devices to capture, guide and change the direction of the connecting lines. By way of example but not limitation, in one implementation of the 2D positioner embodiments each of the line guiding devices is an eyelet that is disposed in the structure. In another implementation of the 2D positioner embodiments each of the line guiding devices is a single sheave. In yet another implementation of the 2D positioner embodiments each of the line guiding devices is a cooperative arrangement of a plurality of sheaves. The 2D positioner embodiments described herein can use various types of sheaves. The particular type of sheave that is used in a given embodiment of the 2D positioner can be determined based on various factors such as the type of connecting line that is being used in the embodiment, the size of the 2D space that is being supported by the embodiment, and the mass of the object that is being positioned and moved by the embodiment, among other factors. It will be appreciated that it is advantageous for each of the sheaves to have a grooved shape that prevents slippage and derailing of the connecting line that is reeved to the sheave. It is further advantageous for each of the sheaves to have rounded edges that minimize lateral friction on the connecting line that is reeved to the sheave. Other features of sheaves are well known to those skilled in the art of object positioning, and thus need not be described in more detail.

The 2D positioner embodiments described herein can use various types of structures to establish the vertices which define the empty 2D space within which the object is being positioned and moved. The particular type of structure that is used in a given embodiment of the 2D positioner can be determined based on various factors such as the size of the 2D space that is being supported by the embodiment, the mass of the object that is being positioned and moved by the embodiment, the type of line guiding devices that are being used in the embodiment, and the function(s) the object is performing, among other factors. By way of example but not limitation, in one implementation of the 2D positioner embodiments the structure includes a planar member (such as a board, or the like) and a number of longitudinal support members (such as poles, or posts, or the like) that are rigidly disposed at prescribed locations on the planar member, where the number of longitudinal support members equals the number of vertices in the 2D space, and each of the longitudinal support members establishes a different one of the vertices. In another implementation of the 2D positioner embodiments the structure includes a frame, or the like, having the shape of the 2D space, where each of the corners of the frame establishes a different one of the vertices. In yet another implementation of the 2D positioner embodiments the structure includes the just-described number of longitudinal support members, these support members are rigidly disposed at prescribed locations in the ground, and each of these support members establishes a different one of the vertices.

The line displacement actuators can generally be mounted in any manner that keeps them in a fixed position relative to the line guiding devices. By way of example but not limitation, in one implementation of the 2D positioner embodiments described herein the actuators are rigidly disposed on the exterior of the structure that establishes the vertices which define the empty 2D space within which the object is being positioned and moved (e.g., as exemplified in FIG. 1 actuators 110-112 are rigidly disposed on the exterior of structure 101, and as exemplified in FIG. 2, actuators 212-215 are rigidly disposed on the exterior of structure 201). In another implementation of the 2D positioner embodiments, the actuators are rigidly disposed in a location that is remote from the structure that establishes the vertices.

1.2 Three-Dimensional (3D) Positioning of an Object

This section describes exemplary embodiments of the object positioner described herein that provide for direct 3D control of the positioning and movement of an object. These particular object positioner embodiments are hereafter collectively simply referred to as 3D positioner embodiments. Generally speaking and as will be appreciated from the more detailed description that follows, the 3D positioner embodiments described herein directly control the positioning and movement of an object in three dimensions along a first degree of freedom (e.g., an X-axis), a second degree of freedom (e.g., a Y-axis), and a third degree of freedom (e.g., a Z-axis). The 3D positioner embodiments thus allow the object to be positioned and moved in a controlled manner within a prescribed 3D space.

In the exemplary embodiments of the 3D positioner described herein the 3D space within which the object is being positioned and moved can be any type of 3D space having the shape of a convex polyhedron. In other words, the 3D space can be any type of polyhedron-shaped space having four or more vertices, where the interior angles of the polyhedron-shaped space are all less than 180 degrees. More particularly and by way of example but not limitation, in one embodiment of the 3D positioner the 3D space has the shape of any type of convex pyramid (e.g., the 3D space is defined by four or more vertices, six or more edges, and four or more faces, where the bottom face of this space is a convex polygon, all the lateral faces of this space are triangles, and each of the interior angles of this space is less than 180 degrees). In another embodiment of the 3D positioner the 3D space has the shape of any type of convex prism (e.g., the 3D space is defined by an even number of vertices that is greater than or equal to six, top and bottom faces (also known as bases), three or more lateral edges, and three or more lateral faces, where the top and bottom faces of this space are congruent convex polygons, all the lateral faces of this space are parallelograms, and each of the interior angles of this space is less than 180 degrees). In yet another embodiment of the 3D positioner the 3D space has the shape of any type of convex dodecahedron (e.g., the 3D space is defined by 20 vertices, 30 edges, and 12 faces, where all the faces of this space are pentagons, and each of the interior angles of this space is less than 180 degrees).

A 3D coordinate system can be used to specifically and completely identify the current position and a desired new position of the object within the 3D space. It will be appreciated that various types of 3D coordinate systems can be used in the 3D positioner embodiments described herein. By way of example but not limitation, in one implementation of the 3D positioner embodiments the 3D coordinate system that is used is the conventional Cartesian coordinate system, and the current and desired new positions of the object are identified by coordinates that specify the conventional ordered triplet of numbers (x,y,z). In another implementation of the 3D positioner embodiments the 3D coordinate system that is used is the conventional cylindrical coordinate system, and the current and desired new positions of the object are identified by coordinates that specify the conventional ordered triplet of numbers $(r,\theta,z)$. In yet another implementation of the 3D positioner embodiments the 3D coordinate system that is used is the conventional spherical coordinate system, and the current and desired new positions of the object are identified by coordinates that specify the conventional ordered triplet of numbers $(\rho,\theta,\phi)$.

Figure 3:
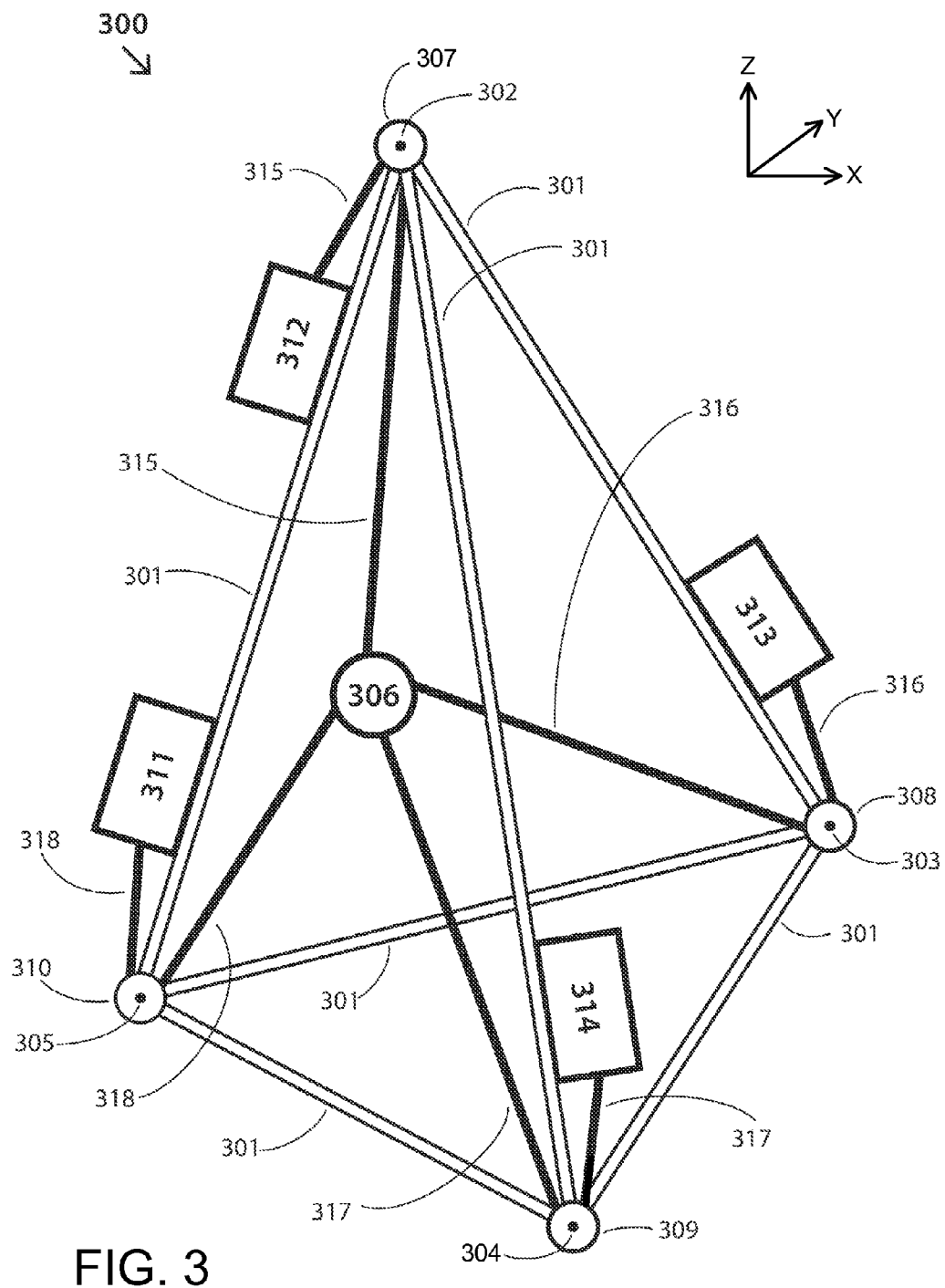
FIG. 3 is a diagram illustrating a perspective view, in simplified form, of a three-dimensional (3D) embodiment of the object positioner described herein that positions and moves an object within a 3D space having the shape of a triangular pyramid.

FIG. 3 illustrates a perspective view, in simplified form, of a triangular pyramid embodiment of the 3D positioner described herein. In other words, FIG. 3 illustrates a perspective view, in simplified form, of an apparatus 300 for positioning and moving an object 306 within a 3D space having the shape of a triangular pyramid. As exemplified in FIG. 3, the apparatus 300 includes a structure 301 that establishes four vertices 302-305 which define an empty triangular pyramid-shaped space (e.g., the interior of this structure is hollow). The apparatus 300 also includes four line guiding devices 307-310 each of which is disposed at the location of a different one of the vertices 302-305 (e.g., line guiding device 307 is disposed at the location of vertex 302). The apparatus 300 also includes four line displacement actuators 311-314 and four connecting lines 315-318, where one end of each of the connecting lines is attached to a different one of the actuators (e.g., one end of connecting line 315 is attached to actuator 312), each of the connecting lines is reeved (e.g., movably coupled) to a different one of the line guiding devices (e.g., connecting line 315 is reeved to line guiding device 307), and the other end of each of the connecting lines is attached to the object 306. In other words, each of the line guiding devices 307-310 is configured to capture and guide a given connecting line 315-318 that is reeved thereto, and causes the connecting line to change direction when it is tensioned (e.g., line guiding device 307 captures and guides connecting line 315 and causes it to change direction when it is tensioned).

Given the foregoing and referring again to FIG. 3, it will be appreciated that each of the connecting lines 315-318 is configured to pull the object 306 in a different direction. More particularly, connecting line 315 is configured to pull the object 306 toward line guiding device 307. Connecting line 316 is configured to pull the object 306 toward line guiding device 308. Connecting line 317 is configured to pull the object 306 toward line guiding device 309. Connecting line 318 is configured to pull the object 306 toward line guiding device 310.

As will be described in more detail hereafter and referring again to FIG. 3, the line displacement actuators 311-314 operate in a coordinated manner to achieve a desired positioning or movement of the object 306 within the empty triangular pyramid-shaped space that is defined by the four vertices 302-305. In other words, each of the actuators 311-314 is selectively operated to displace the connecting line 315-318 that is attached to the actuator in a controlled manner, where a given connecting line displacement can involve either retracting the line a desired amount (such that the length of the line with the triangular pyramid-shaped space is decreased by this amount), or extending the line another desired amount (such that the length of the line within the triangular pyramid-shaped space is increased by this amount). Each of the actuators 311-314 also maintains a prescribed amount of tension on the connecting line 315-318 that is attached to the actuator when this line is being displaced (e.g., the object is being moved), and when the displacement of this line is fixed (e.g., the line displacement is static). More particularly, actuator 312 can displace connecting line 315 in a controlled manner, and also maintains the prescribed amount of tension on line 315 when line 315 is being displaced, and when the displacement of line 315 is fixed. Actuator 313 can displace connecting line 316 in a controlled manner, and also maintains the prescribed amount of tension on line 316 when line 316 is being displaced, and when the displacement of line 316 is fixed. Actuator 314 can displace connecting line 317 in a controlled manner, and also maintains the prescribed amount of tension on line 317 when line 317 is being displaced, and when the displacement of line 317 is fixed. Actuator 311 can displace connecting line 318 in a controlled manner, and also maintains the prescribed amount of tension on line 318 when line 318 is being displaced, and when the displacement of line 318 is fixed.

Referring again to FIG. 3, the line displacement actuators 311-314 operate under the centralized control of an actuator controller (not shown). The actuator controller coordinates the operation of the different actuators 311-314 to achieve a desired positioning or movement of the object 306. More particularly, the actuator controller can use the aforementioned 3D coordinate system to keep track of the coordinates of the current position of the object 306 within the empty triangular pyramid-shaped space that is defined by the four vertices 302-305, and specify the coordinates of a desired new position for the object within this space. The actuator controller can then use this knowledge of the coordinates of the current position of the object 306 and the coordinates of the desired new position for the object to calculate the amount each of the connecting lines 315-318 is to be displaced in order to move the object from its current position to the desired new position. A positive calculated amount can mean that a given connecting line is to be extended and a negative calculated amount can mean that the line is to be retracted, or vice versa. It will be appreciated that various connecting line displacement scenarios are possible, each of which depends on the particular current position of the object and the particular desired new position for the object. In one exemplary scenario the actuator controller can retract just one of the connecting lines, and the other three connecting lines can be extended. In another exemplary scenario the actuator controller can retract a given pair of connecting lines, and the other two connecting lines that are not part of the pair can be extended. In yet another exemplary scenario the actuator controller can retract a given triple of connecting lines, and the fourth line that is not part of the triple can be extended.

Figure 4:
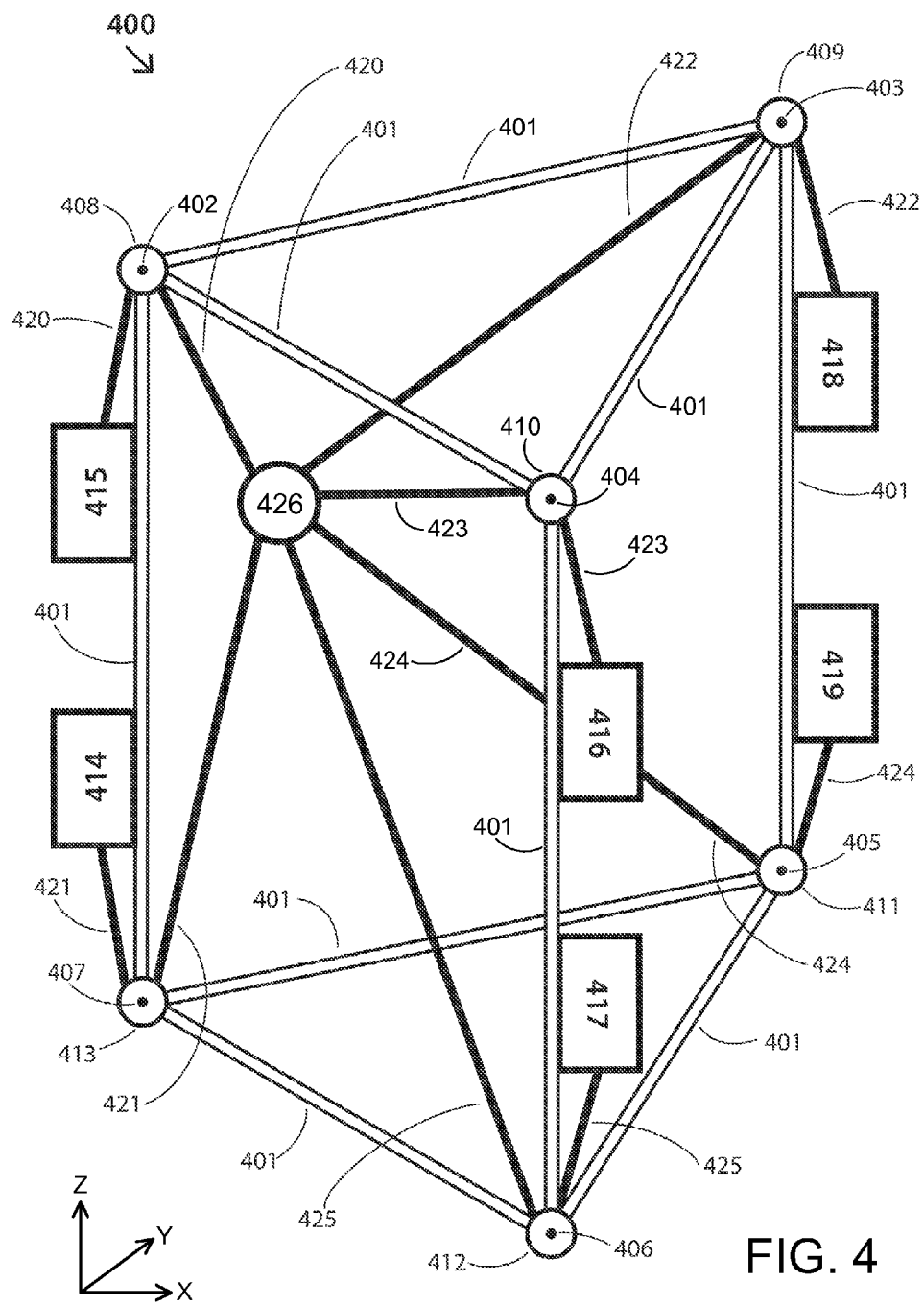
FIG. 4 is a diagram illustrating a perspective view, in simplified form, of another 3D embodiment of the object positioner described herein that positions and moves an object within a 3D space having the shape of a triangular prism.

FIG. 4 illustrates a perspective view, in simplified form, of a triangular prism embodiment of the 3D positioner described herein. In other words, FIG. 4 illustrates a perspective view, in simplified form, of an apparatus 400 for positioning and moving an object 426 within a 3D space having the shape of a triangular prism. As exemplified in FIG. 4, the apparatus 400 includes a structure 401 that establishes six vertices 402-407 which define an empty triangular prism-shaped space (e.g., the interior of this structure is hollow). The apparatus 400 also includes six line guiding devices 408-413 each of which is disposed at the location of a different one of the vertices 402-407 (e.g., line guiding device 408 is disposed at the location of vertex 402). The apparatus 400 also includes six line displacement actuators 414-419 and six connecting lines 420-425, where one end of each of the connecting lines is attached to a different one of the actuators (e.g., one end of connecting line 420 is attached to actuator 415), each of the connecting lines is reeved (e.g., movably coupled) to a different one of the line guiding devices (e.g., connecting line 420 is reeved to line guiding device 408), and the other end of each of the connecting lines is attached to the object 426. In other words, each of the line guiding devices 408-413 is configured to capture and guide a given connecting line 420-425 that is reeved thereto, and causes the connecting line to change direction when it is tensioned (e.g., line guiding device 408 captures and guides connecting line 420 and causes it to change direction when it is tensioned).

Given the foregoing and referring again to FIG. 4, it will be appreciated that each of the connecting lines 420-425 is configured to pull the object 426 in a different direction. More particularly, connecting line 420 is configured to pull the object 426 toward line guiding device 408. Connecting line 423 is configured to pull the object 426 toward line guiding device 410. Connecting line 422 is configured to pull the object 426 toward line guiding device 409. Connecting line 421 is configured to pull the object 426 toward line guiding device 413. Connecting line 425 is configured to pull the object 426 toward line guiding device 412. Connecting line 424 is configured to pull the object 426 toward line guiding device 411.

As will be described in more detail hereafter and referring again to FIG. 4, the line displacement actuators 414-419 operate in a coordinated manner to achieve a desired positioning or movement of the object 426 within the empty triangular prism-shaped space that is defined by the six vertices 402-407. In other words, each of the actuators 414-419 is selectively operated to displace the connecting line 420-425 that is attached to the actuator in a controlled manner, where a given connecting line displacement can involve either retracting the line a desired amount (such that the length of the line within the triangular prism-shaped space is decreased by this amount), or extending the line another desired amount (such that the length of the line within the triangular prism-shaped space is increased by this amount). Each of the actuators 414-419 also maintains a prescribed amount of tension on the connecting line 420-425 that is attached to the actuator when this line is being displaced, and when the displacement of this line is fixed. More particularly, actuator 415 can displace connecting line 420 in a controlled manner, and also maintains the prescribed amount of tension on line 420 when line 420 is being displaced, and when the displacement of line 420 is fixed. Actuator 416 can displace connecting line 423 in a controlled manner, and also maintains the prescribed amount of tension on line 423 when line 423 is being displaced, and when the displacement of line 423 is fixed. Actuator 418 can displace connecting line 422 in a controlled manner, and also maintains the prescribed amount of tension on line 422 when line 422 is being displaced, and when the displacement of line 422 is fixed. Actuator 414 can displace connecting line 421 in a controlled manner, and also maintains the prescribed amount of tension on line 421 when line 421 is being displaced, and when the displacement of line 421 is fixed. Actuator 417 can displace connecting line 425 in a controlled manner, and also maintains the prescribed amount of tension on line 425 when line 425 is being displaced, and when the displacement of line 425 is fixed. Actuator 419 can displace connecting line 424 in a controlled manner, and also maintains the prescribed amount of tension on line 424 when line 424 is being displaced, and when the displacement of line 424 is fixed.

Referring again to FIG. 4, the line displacement actuators 414-419 operate under the centralized control of an actuator controller (not shown). The actuator controller coordinates the operation of the different actuators 414-419 to achieve a desired positioning or movement of the object 426. More particularly, the actuator controller can use the aforementioned 3D coordinate system to keep track of the coordinates of the current position of the object 426 within the empty triangular prism-shaped space that is defined by the six vertices 402-407, and specify the coordinates of a desired new position for the object within this space. The actuator controller can then use this knowledge of the coordinates of the current position of the object 426 and the coordinates of the desired new position for the object to calculate the amount each of the connecting lines 420-425 is to be displaced in order to move the object from its current position to the desired new position. It will be appreciated that various connecting line displacement scenarios are possible, each of which depends on the particular current position of the object and the particular desired new position for the object. In one exemplary scenario the actuator controller can retract just one of the connecting lines, and the other five connecting lines can be extended. In another exemplary scenario the actuator controller can retract a given pair of connecting lines that are reeved to line guiding devices which are adjacent to each other on the structure 401 (e.g., connecting lines 420 and 421), and the other four connecting lines that are not part of the pair (e.g., connecting lines 422-425) can be extended. In yet another exemplary scenario the actuator controller can retract a given triple of connecting lines that are reeved to line guiding devices which are adjacent to each other on the structure 401 (e.g., connecting lines 420, 422 and 423), and the other three connecting lines that are not part of the triple (e.g., connecting lines 421, 425 and 424) can be extended.

The 3D positioner embodiments described herein can use various types of connecting lines examples of which have been provided heretofore. The particular type of connecting line that is used in a given embodiment of the 3D positioner can be determined based on various factors such as the size of the 3D space within which the object is being positioned and moved, and the mass of the object, among other factors. Regarding the prescribed amount of tension that each of the line displacement actuators maintains on the connecting line that is attached to the actuator, in one implementation of the 3D positioner embodiments the prescribed amount of tension is a target tension value. In another implementation of the 3D positioner embodiments the prescribed amount of tension is a range of tension values.

The 3D positioner embodiments described herein can use various types of line guiding devices to capture, guide and change the direction of the connecting lines. By way of example but not limitation, in one implementation of the 3D positioner embodiments each of the line guiding devices is an eyelet that is disposed in the structure. In another implementation of the 3D positioner embodiments each of the line guiding devices is a single sheave. In yet another implementation of the 3D positioner embodiments each of the line guiding devices is a cooperative arrangement of a plurality of sheaves. The 3D positioner embodiments described herein can use various types of sheaves. The particular type of sheave that is used in a given embodiment of the 3D positioner can be determined based on various factors such as the type of connecting line that is being used in the embodiment, the size of the 3D space that is being supported by the embodiment, and the mass of the object that is being positioned and moved by the embodiment, among other factors. Exemplary advantageous features of the sheaves have been provided heretofore.

The 3D positioner embodiments described herein can use various types of structures to establish the vertices which define the empty 3D space within which the object is being positioned and moved. The particular type of structure that is used in a given embodiment of the 3D positioner can be determined based on various factors such as the size of the 3D space that is being supported by the embodiment, the mass of the object that is being positioned and moved by the embodiment, the type of line guiding devices that are being used in the embodiment, and the function(s) the object is performing, among other factors. By way of example but not limitation, in one implementation of the 3D positioner embodiments the structure includes a frame, or the like, where each of the corners of the frame establishes a different one of the vertices. In another implementation of the 3D positioner embodiments, whenever the 3D space has the aforementioned shape of any type of convex prism, the structure includes a number of longitudinal support members (such as poles, or posts, or the like) that are rigidly disposed at prescribed locations in the ground, where the number of longitudinal support members equals the number of lateral edges in the 3D space, and each of these support members establishes a different pair of vertices in the 3D space.

The line displacement actuators can generally be mounted in any manner that keeps them in a fixed position relative to the line guiding devices. By way of example but not limitation, in one implementation of the 3D positioner embodiments described herein the actuators are rigidly disposed on the exterior of the structure that establishes the vertices which define the empty 3D space within which the object is being positioned and moved (e.g., as exemplified in FIG. 3 actuators 311-314 are rigidly disposed on the exterior of structure 301, and as exemplified in FIG. 4, actuators 414-419 are rigidly disposed on the exterior of structure 401). In another implementation of the 3D positioner embodiments, the actuators are rigidly disposed in a location that is remote from the structure that establishes the vertices.

1.3 Alternate Three-Dimensional (3D) Positioning of an Object

This section describes exemplary embodiments of the object positioner described herein that provide for direct 3D control of the positioning and movement of a first attachment point on an object, and separate direct 3D control of the positioning and movement of a second attachment point on the object. These particular object positioner embodiments are hereafter collectively simply referred to as alternate 3D positioner embodiments. Generally speaking and as will be appreciated from the more detailed description that follows, the alternate 3D positioner embodiments described herein directly control the positioning and movement of a first attachment point on an object in three dimensions along a first degree of freedom (e.g., an X-axis), a second degree of freedom (e.g., a Y-axis), and a third degree of freedom (e.g., a Z-axis). The alternate 3D positioner embodiments also separately directly control the positioning and movement of a second attachment point on the object along the first, second and third degrees of freedom. As such, the alternate 3D positioner embodiments can directly control the vertical positioning and movement of the object (e.g., the positioning and movement of the centroid of the object along the Z-axis), the pitch of the object (e.g., the rotation of the object about the object's pitch axis), and the yaw of the object (e.g., the rotation of the object about the object's yaw axis).

Figure 5:
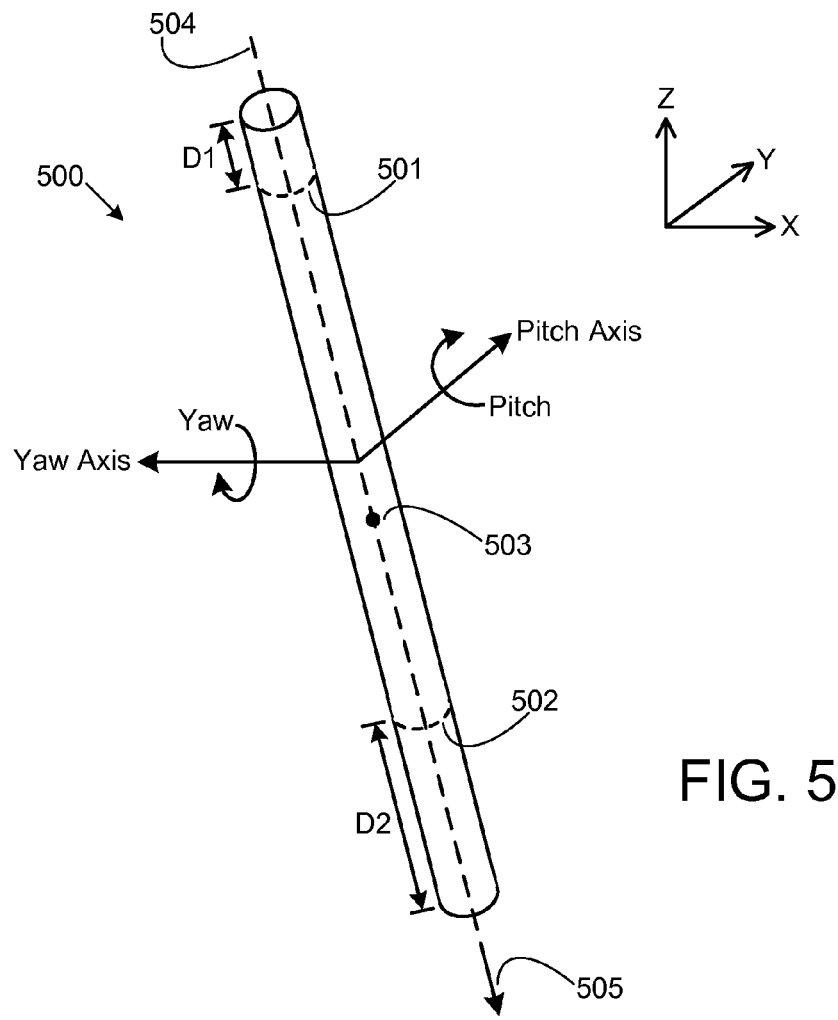
FIG. 5 is a diagram illustrating a perspective view, in simplified form, of an exemplary embodiment of an object having two different attachment points that can be separately positioned and moved by alternate 3D embodiments of the object positioner described herein.

FIG. 5 illustrates a perspective view, in simplified form, of an exemplary embodiment of an object that can be positioned and moved by the alternate 3D positioner embodiments described herein. As exemplified in FIG. 5, the object is a rod 500. As will be appreciated from the more detailed description that follows, by separately controlling the positioning and movement of an upper attachment point 501 on the rod 500 and a lower attachment point 502 on the rod in three dimensions, the alternate 3D positioner embodiments allow the rod to be positioned and moved in a controlled manner as follows. The alternate 3D positioner embodiments can directly control the positioning and movement of the centroid 503 of the rod 500 along the Z-axis (e.g., the vertical positioning and movement of the rod). The alternate 3D positioner embodiments can also directly control the pitch of the rod 500 (e.g., the rotation of the rod about the rod's pitch axis, where this pitch axis is perpendicular to the rod's longitudinal axis 504 and intersects this longitudinal axis midway between the upper and lower attachment points 501 and 502). The alternate 3D positioner embodiments can also directly control the yaw of the rod 500 (e.g., the rotation of the rod about the rod's yaw axis, where this yaw axis is perpendicular to both the rod's longitudinal axis 504 and the rod's pitch axis, and intersects this longitudinal axis midway between the upper and lower attachment points 501 and 502). In other words, by separately controlling the positioning and movement of the upper and lower attachments points 501 and 502 on the rod 500 in three dimensions, the alternate 3D positioner embodiments can position and move the longitudinal axis 504 of the rod along a range of different vectors 505 in 3D space.

Given the foregoing and referring again to FIG. 5, it will be appreciated that any of the aforementioned different types of useful objects (e.g., either the aforementioned image sensing device, or painting device, or other types of end effectors) (not shown) can be attached to one of the ends of the rod 500. In this case, the object that is being positioned and moved by the alternate 3D positioner embodiments described herein is the combination of the rod 500 and the particular useful object that is attached thereto. The alternate 3D positioner embodiments can thus position and move the different types of useful objects along the Z-axis, and can orient such useful objects along a range of different vectors 505 in 3D space.

Referring again to FIG. 5, the upper attachment point 501 is located a first prescribed distance D1 from one end of the rod 500, and the lower attachment point 502 is located a second prescribed distance D2 from the other end of the rod. As exemplified in FIG. 5, when D1 is different than D2, the pitch and yaw axes will intersect the longitudinal axis 504 at a point that is different than the centroid 503 of the rod. In another embodiment (not shown) where D1 is the same as D2, the pitch and yaw axes will intersect the longitudinal axis 504 at the centroid 503 of the rod.

Referring again to FIG. 5, any of the aforementioned 3D coordinate systems can be used to specifically and completely identify the current position within 3D space of both the upper attachment point 501 on the rod 500 and the lower attachment point 502 on the rod, and a desired new position within 3D space of both the upper attachment point on the rod and the lower attachment point on the rod. More particularly and by way of example but not limitation, in one implementation of the alternate 3D positioner embodiments described herein the 3D coordinate system that is used is the conventional Cartesian coordinate system, and the current and desired new positions of both the upper and lower attachment points 501 and 502 on the rod 500 are identified by coordinates that specify the conventional ordered triplet of numbers (x,y,z). In another implementation of the alternate 3D positioner embodiments the 3D coordinate system that is used is the conventional cylindrical coordinate system, and the current and desired new positions of both the upper and lower attachment points 501 and 502 on the rod 500 are identified by coordinates that specify the conventional ordered triplet of numbers (r,θ,z). In yet another implementation of the alternate 3D positioner embodiments the 3D coordinate system that is used is the conventional spherical coordinate system, and the current and desired new positions of both the upper and lower attachment points 501 and 502 on the rod 500 are identified by coordinates that specify the conventional ordered triplet of numbers (ρ,θ,φ).

As will be appreciated from the more detailed description that follows, the alternate 3D positioner embodiments described herein employ an apparatus that separately positions and moves two different attachment points on an object within a 3D space. The apparatus generally includes three or more longitudinal support members that establish the lateral edges of an empty 3D space having the shape of a convex prism, and also partially establish the corresponding lateral faces of the 3D space. In one exemplary embodiment of the alternate 3D positioner the number of longitudinal support members is three and the convex prism is a triangular prism having three lateral faces. This particular embodiment is described in more detail hereafter. In another exemplary embodiment of the alternate 3D positioner the number of longitudinal support members is four and the convex prism is a cuboid (also known as a rectangular parallelepiped) having four lateral faces. In yet another exemplary embodiment of the alternate 3D positioner the number of longitudinal support members is five and the convex prism is a pentagonal prism having five lateral faces. In yet another exemplary embodiment of the alternate 3D positioner the number of longitudinal support members is six and the convex prism is a hexagonal prism having six lateral faces.

Figure 6:
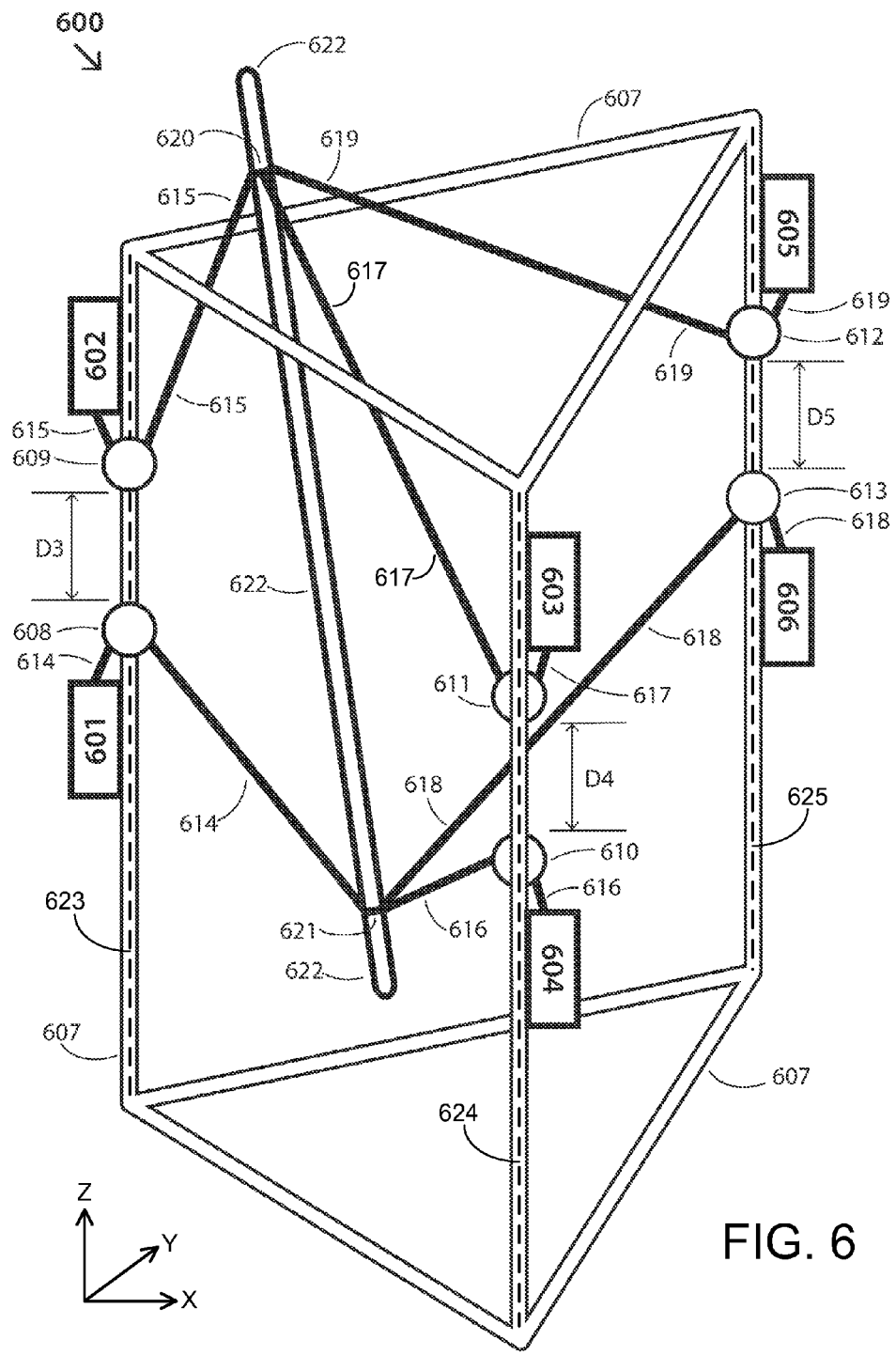
FIG. 6 is a diagram illustrating a perspective view, in simplified form, of an alternate 3D embodiment of the object positioner described herein that separately positions and moves two different attachment points on an object within a 3D space having the shape of a triangular prism.

FIG. 6 illustrates a perspective view, in simplified form, of an exemplary embodiment of the alternate 3D positioner described herein. In other words, FIG. 6 illustrates a perspective view, in simplified form, of an apparatus 600 for separately positioning and moving two different attachment points 620 and 621 on an object 622. In the particular embodiment exemplified in FIG. 6 the object 622 is the aforementioned rod. As exemplified in FIG. 6, the apparatus 600 includes three longitudinal support members 623-625 that establish the lateral edges of an empty 3D space having the shape of a triangular prism, and also partially establish the corresponding lateral faces of the 3D space. The apparatus 600 also includes three upper line guiding devices 609/611/612 each of which is disposed on a different one of the support members 623-625 (e.g., upper line guiding device 609 is disposed on support member 623). The apparatus also includes three lower line guiding devices 608/610/613 each of which is disposed on a different one of the support members 623-625 beneath the upper line guiding device that is disposed thereon (e.g., lower line guiding device 608 is disposed on support member 623 beneath upper line guiding device 609). The apparatus 600 also includes three upper line displacement actuators 602/603/605, three lower line displacement actuators 601/604/606, three upper connecting lines 615/617/619, and three lower connecting lines 614/616/618.

Referring again to FIG. 6, various types of structures can be used to establish the longitudinal support members 623-625. The particular type of structure that is used can be determined based on various factors such as the size of the aforementioned empty 3D space that is established by the longitudinal support members 623-625, the mass of the object 622 (which includes the mass of the aforementioned useful object that may be attached thereto), the type of upper and lower line guiding devices 608-613 that are being used, and the function(s) the object is performing, among other factors. By way of example but not limitation, in the particular apparatus 600 embodiment that is shown in FIG. 6, the longitudinal support members 623-625 are established by a frame 607. An alternate apparatus embodiment (not shown) is also possible where each of the longitudinal support members is implemented as a separate element (such as a pole, or a post, or the like) that is rigidly disposed at a prescribed location in the ground.

Referring again to FIG. 6, one end of each of the upper connecting lines 615/617/619 is attached to a different one of the upper line displacement actuators 602/603/605 (e.g., one end of connecting line 615 is attached to actuator 602). Each of the upper connecting lines 615/617/619 is reeved (e.g., movably coupled) to a different one of the upper line guiding devices 609/611/612 (e.g., connecting line 615 is reeved to line guiding device 609). The other end of each of the upper connecting lines 615/617/619 is attached to an upper attachment point 620 on the object 622. In other words, each of the upper line guiding devices 609/611/612 is configured to capture and guide a given upper connecting line 615/617/619 that is reeved thereto, and causes the connecting line to change direction when it is tensioned (e.g., line guiding device 609 captures and guides connecting line 615 and causes it to change direction when it is tensioned).

Referring again to FIG. 6, one end of each of the lower connecting lines 614/616/618 is attached to a different one of the lower line displacement actuators 601/604/606 (e.g., one end of connecting line 614 is attached to actuator 601). Each of the lower connecting lines 614/616/618 is reeved to a different one of the lower line guiding devices 608/610/613 (e.g., connecting line 614 is reeved to line guiding device 608). The other end of each of the lower connecting lines 614/616/618 is attached to an lower attachment point 621 on the object 622. In other words, each of the lower line guiding devices 608/610/613 is configured to capture and guide a given lower connecting line 614/616/618 that is reeved thereto, and causes the connecting line to change direction when it is tensioned (e.g., line guiding device 608 captures and guides connecting line 614 and causes it to change direction when it is tensioned).

Given the foregoing and referring again to FIG. 6, it will be appreciated that each of the upper connecting lines 615/617/619 is configured to pull the upper attachment point 620 on the object 622 in a different direction. More particularly, upper connecting line 615 is configured to pull the upper attachment point 620 toward upper line guiding device 609. Upper connecting line 617 is configured to pull the upper attachment point 620 toward upper line guiding device 611. Upper connecting line 619 is configured to pull the upper attachment point 620 toward upper line guiding device 612. Similarly, each of the lower connecting lines 614/616/618 is configured to pull the lower attachment point 621 on the object 622 in a different direction. More particularly, lower connecting line 614 is configured to pull the lower attachment point 621 toward lower line guiding device 608. Lower connecting line 616 is configured to pull the lower attachment point 621 toward lower line guiding device 610. Lower connecting line 618 is configured to pull the lower attachment point 621 toward lower line guiding device 613.

As exemplified in FIG. 6, lower line guiding device 608 is located a prescribed distance D3 beneath upper line guiding device 609. Lower line guiding device 610 is located a prescribed distance D4 beneath upper line guiding device 611. Lower line guiding device 613 is located a prescribed distance D5 beneath upper line guiding device 612. Distances D3, D4 and D5 can have various values. By way of example but not limitation, in one implementation of the alternate 3D positioner embodiments described herein distances D3, D4 and D5 have the same value. In another implementation of the alternate 3D positioner embodiments distances D3, D4 and D5 have different values. It will be appreciated that decreasing the values of distances D3, D4 and D5 serves to increase the range of vertical positioning and movement of the object 622, while increasing the values of distances D3, D4 and D5 serves to decrease the range of vertical positioning and movement of the object.

As will be described in more detail hereafter and referring again to FIG. 6, the upper and lower line displacement actuators 601-606 operate in a coordinated manner to achieve a desired positioning or movement of the object 622. In other words, each of the upper line displacement actuators 602/603/605 is selectively operated to displace the upper connecting line 615/617/619 that is attached to the upper line displacement actuator in a controlled manner in order to achieve a desired positioning or movement of the upper attachment point 620 on the object 622 within the bounds of the aforementioned lateral faces of the 3D space. A given upper connecting line 615/617/619 displacement can involve either retracting the line a desired amount (such that the length of the line within these bounds is decreased by this amount), or extending the line another desired amount (such that the length of the line within these bounds is increased by this amount). Each of the upper line displacement actuators 602/603/605 also maintains a first prescribed amount of tension on the upper connecting line 615/617/619 that is attached to the upper line displacement actuator when this line is being displaced, and when the displacement of this line is fixed. More particularly, actuator 602 can displace connecting line 615 in a controlled manner, and also maintains the first prescribed amount of tension on line 615 when line 615 is being displaced, and when the displacement of line 615 is fixed. Actuator 603 can displace connecting line 617 in a controlled manner, and also maintains the first prescribed amount of tension on line 617 when line 617 is being displaced, and when the displacement of line 617 is fixed. Actuator 605 can displace connecting line 619 in a controlled manner, and also maintains the first prescribed amount of tension on line 619 when line 619 is being displaced, and when the displacement of line 619 is fixed.

Similarly and referring again to FIG. 6, each of the lower line displacement actuators 601/604/606 is selectively operated to displace the lower connecting line 614/616/618 that is attached to the lower line displacement actuator in a controlled manner in order to achieve a desired positioning or movement of the lower attachment point 621 on the object 622 within the bounds of the lateral faces of the 3D space. A given lower connecting line 614/616/618 displacement can involve either retracting the line a desired amount (such that the length of the line within these bounds is decreased by this amount), or extending the line another desired amount (such that the length of the line within these bounds is increased by this amount). Each of the lower line displacement actuators 601/604/606 also maintains a second prescribed amount of tension on the lower connecting line 614/616/618 that is attached to the lower line displacement actuator when this line is being displaced, and when the displacement of this line is fixed. More particularly, actuator 601 can displace connecting line 614 in a controlled manner, and also maintains the second prescribed amount of tension on line 614 when line 614 is being displaced, and when the displacement of line 614 is fixed. Actuator 604 can displace connecting line 616 in a controlled manner, and also maintains the second prescribed amount of tension on line 616 when line 616 is being displaced, and when the displacement of line 616 is fixed. Actuator 606 can displace connecting line 618 in a controlled manner, and also maintains the second prescribed amount of tension on line 618 when line 618 is being displaced, and when the displacement of line 618 is fixed.

Referring again to FIG. 6, the upper and lower line displacement actuators 601-606 operate under the centralized control of an actuator controller (not shown). The actuator controller coordinates the operation of the upper line displacement actuators 602/603/605 to achieve a desired positioning or movement of the upper attachment point 620 on the object 622. More particularly, the actuator controller can use the aforementioned 3D coordinate system to keep track of the coordinates of the current position of the upper attachment point 620 within the bounds of the lateral faces of the 3D space, and specify the coordinates of a desired new position for the upper attachment point within these bounds. The actuator controller can then use this knowledge of the coordinates of the current position of the upper attachment point 620 and the coordinates of the desired new position for the upper attachment point to calculate the amount each of the upper connecting lines 615/617/619 is to be displaced in order to move the upper attachment point from its current position to the desired new position.

Similarly and referring again to FIG. 6, the actuator controller coordinates the operation of the lower line displacement actuators 601/604/606 to achieve a desired positioning or movement of the lower attachment point 621 on the object 622. More particularly, the actuator controller can use the 3D coordinate system to keep track of the coordinates of the current position of the lower attachment point 621 within the just-described bounds, and specify the coordinates of a desired new position for the lower attachment point within these bounds. The actuator controller can then use this knowledge of the coordinates of the current position of the lower attachment point 621 and the coordinates of the desired new position for the lower attachment point to calculate the amount each of the lower connecting lines 614/616/618 is to be displaced in order to move the lower attachment point from its current position to the desired new position.

Referring again to FIG. 6, the upper line displacement actuators 602/603/605 can generally be mounted in any manner that keeps them in a fixed position relative to the upper line guiding devices 609/611/613. Similarly, the lower line displacement actuators 601/604/606 can generally be mounted in any manner that keeps them in a fixed position relative to the lower line guiding devices 608/610/613. By way of example but not limitation, in the particular apparatus 600 embodiment that is shown in FIG. 6, each of the upper line displacement actuators is rigidly disposed on the longitudinal support member on which the particular upper line guiding device to which the upper connecting line that is attached to the upper line displacement actuator is reeved, where this actuator is located adjacent to this line guiding device (e.g., actuator 602 is rigidly disposed on support member 623 adjacent to line guiding device 609); each of the lower line displacement actuators is rigidly disposed on the longitudinal support member on which the particular lower line guiding device to which the lower connecting line that is attached to the lower line displacement actuator is reeved, where this actuator is located adjacent to this line guiding device (e.g., actuator 601 is rigidly disposed on support member 623 adjacent to line guiding device 608). An alternate apparatus embodiment (not shown) is also possible where the upper and lower line displacement actuators are rigidly disposed in a location that is remote from the longitudinal support members.

The alternate 3D positioner embodiments described herein can use various types of connecting lines examples of which have been provided heretofore. The particular type of connecting line that is used in a given embodiment of the alternate 3D positioner can be determined based on various factors such as the size of the 3D space within which the upper and lower attachment points on the object are being positioned and moved, and the mass of the object (which includes the mass of the useful object that may be attached thereto), among other factors. Regarding the first prescribed amount of tension that each of the upper line displacement actuators maintains on the upper connecting line that is attached to the upper line displacement actuator, and the second prescribed amount of tension that each of the lower line displacement actuators maintains on the lower connecting line that is attached to the lower line displacement actuator, in an exemplary implementation of the alternate 3D positioner embodiments the first prescribed amount of tension is the same as the second prescribed amount of tension. However, an alternate implementation of the alternate 3D positioner embodiments is also possible where the first prescribed amount of tension is different than the second prescribed amount of tension. Furthermore, either the first and second prescribed amounts of tension can be a target tension value, or the first and second prescribed amounts of tension can be a range of tension values, or the first prescribed amount of tension can be a target tension value and the second prescribed amount of tension can be a range of tension values, or vice versa.

The alternate 3D positioner embodiments described herein can use various types of line guiding devices to capture, guide and change the direction of the upper and lower connecting lines. By way of example but not limitation, in one implementation of the alternate 3D positioner embodiments each of the upper and lower line guiding devices is an eyelet that is disposed in a given longitudinal support member. In another implementation of the alternate 3D positioner embodiments each of the upper and lower line guiding devices is a single sheave. In yet another implementation of the alternate 3D positioner embodiments each of the upper and lower line guiding devices is a cooperative arrangement of a plurality of sheaves. The alternate 3D positioner embodiments described herein can use various types of sheaves. The particular type of sheave that is used in a given embodiment of the alternate 3D positioner can be determined based on various factors such as the type of connecting line that is being used in the embodiment, the size of the 3D space that is being supported by the embodiment, and the mass of the object that is being positioned and moved by the embodiment, among other factors. Exemplary advantageous features of the sheaves have been provided heretofore.

1.4 Line Displacement Actuator and Actuator Controller

This section provides a more detailed description of the line displacement actuators and the actuator controller described herein. Generally speaking, each of the line displacement actuators can be any type of device, or combination of devices, that can displace the connecting line which is attached to the actuator in a controlled manner, and can also maintain a prescribed amount of tension on the connecting line.

Figure 7:
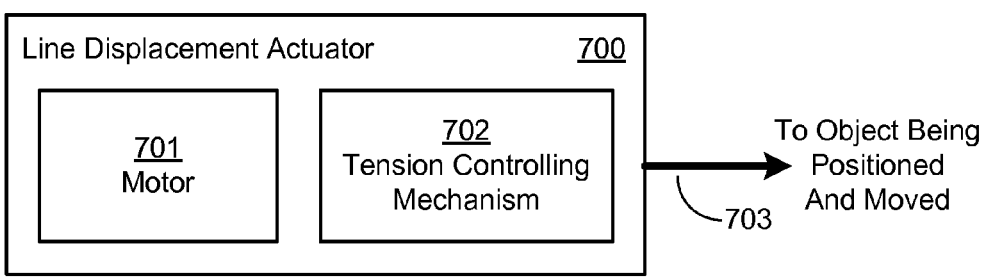
FIG. 7 is a diagram illustrating an exemplary embodiment, in simplified form, of a line displacement actuator.

FIG. 7 illustrates an exemplary embodiment, in simplified form, of one of the line displacement actuators described herein. As exemplified in FIG. 7, the line displacement actuator 700 includes a motor 701 and a tension controlling mechanism 702. As described heretofore, one end of a connecting line 703 is attached to the actuator 700. The connecting line 703 is reeved (e.g., movably coupled) to a line guiding device (not shown) that is configured to capture and guide the line, and causes the line to change direction when it is tensioned. The other end of the connecting line 703 is attached to an object (not shown) whose positioning and movement are being controlled. The actuator 700 operates under the control of an actuator controller (not shown) as described heretofore.

Generally speaking and referring again to FIG. 7, the motor 701 is configured to drive the connecting line 703 in a controlled manner in order to achieve a desired displacement of the line. More particularly, the motor 701 can operate in a variety of modes that include, but are not limited to, a line retraction mode, a line extension mode, and a steady state mode. In the line retraction mode the motor 701 retracts the connecting line 703 a desired amount when an appropriate control signal (which can be either analog or digital) is received from the actuator controller. In the line extension mode the motor 701 extends the connecting line 703 another desired amount when another appropriate control signal is received from the actuator controller. In the steady state mode the motor 701 prevents the connecting line 703 from being displaced (e.g., the motor keeps the amount of the line that is inside the 2D or 3D space within which the object is being positioned and moved from changing).

Referring again to FIG. 7, it will be appreciated that the motor 701 can be configured to drive the connecting line 703 in a variety of ways. By way of example but not limitation, in one implementation of the object positioner embodiments described herein the motor 701 can drive a spool (not shown) to which the connecting line 703 is attached. When the motor 701 is rotated in one direction the connecting line 703 is wound up on the spool, thus resulting in the line being retracted and the object to which the line is attached being pulled toward the line guiding device to which the line is reeved. When the motor 701 is rotated in the opposite direction the connecting line 703 is wound out from the spool, thus resulting in the line being extended, and allowing the object to which the line is attached to be pulled away from the line guiding device to which the line is reeved.

Referring again to FIG. 7, the object positioner embodiments described herein can use various types of motors 701 to drive the connecting line 703 in the just-described controlled manner. By way of example but not limitation, in one implementation of the object positioner embodiments the motor 701 is any one of a variety of conventional servomotors. In another implementation of the object positioner embodiments the motor 701 is any one of a variety of conventional stepper motors. The particular type of motor that is used in a given embodiment of the object positioner can be determined based on various factors such as the mass of the object that is being positioned and moved by the embodiment, and the size of the 2D or 3D space that is being supported by the embodiment, among other factors.

Referring again to FIG. 7, the tension controlling mechanism 702 is configured to maintain the aforementioned prescribed amount of tension on the connecting line 703 when the motor 701 is operating in its various modes including, but not limited to, the just-described line retraction mode, line extension mode, and steady state mode. The object positioner embodiments described herein can use various types of tension controlling mechanisms 702. By way of example but not limitation, in one implementation of the object positioner embodiments the tension controlling mechanism 702 is a torque motor that is matched to the particular type of motor 701 that is being used. In another implementation of the object positioner embodiments the tension controlling mechanism 702 is a clutch.

The actuator controller can be implemented in various ways. In an exemplary implementation of the object positioner embodiments described herein the actuator controller is a computing device. It will be appreciated that any one of a wide variety of types of computing devices can be used. Such computing devices are well known to those skilled in the art of computing, and thus need not be described in more detail.

2.0 Additional Embodiments

While the object positioner has been described by specific reference to embodiments thereof, it is understood that variations and modifications thereof can be made without departing from the true spirit and scope of the object positioner. It is also noted that any or all of the aforementioned embodiments can be used in any combination desired to form additional hybrid embodiments. Although the object positioner embodiments have been described in language specific to structural features and/or methodological acts, it is to be understood that the subject matter defined in the appended claims is not necessarily limited to the specific features or acts described here- Wherefore, what is claimed is:

1. An apparatus for positioning and moving an object, comprising:
    a structure that establishes a number of vertices which define an empty two-dimensional (2D) space having the shape of a convex polygon, said number being greater than or equal to three;
    the same number of line guiding devices, each of which is disposed at the location of a different one of the vertices;
    the same number of line displacement actuators; and
    the same number of connecting lines, wherein,
    one end of each of the connecting lines is attached to a different one of the line displacement actuators,
    each of the connecting lines is reeved to a different one of the line guiding devices,
    the other end of each of the connecting lines is attached to the object,
    each of the line displacement actuators is selectively operated to displace the connecting line that is attached thereto in a controlled manner in order to achieve a desired positioning or movement of the object within the 2D space, and
    each of the line displacement actuators maintains a prescribed amount of tension on the connecting line that is attached thereto when said line is being displaced, and when the displacement of said line is fixed, and wherein
    the line displacement actuators operate under the centralized control of an actuator controller which coordinates the operation of said actuators to achieve the desired positioning or movement of the obiect,
    each of the line displacement actuators comprises a motor and a tension controlling mechanism,
    the motor is configured to drive the connecting line that is attached to the line displacement actuator in a controlled manner in order to achieve a desired displacement of said line,
    the motor operates in a variety of modes comprising a line retraction mode which retracts said line a desired amount when an appropriate control signal is received from the actuator controller, an extension mode which extends said line another desired amount when another appropriate control signal is received from the actuator controller, and a steady state mode which prevents said line from being displaced, and
    the tension controlling mechanism is configured to maintain the prescribed amount of tension on said line when the motor is operating in the variety of modes.

2. The apparatus of claim 1, wherein the actuator controller comprises a computing device.

3. The apparatus of claim 1, wherein the motor comprises either a servomotor or a stepper motor.

4. The apparatus of claim 1, wherein the tension controlling mechanism comprises either a torque motor or a clutch.

5. The apparatus of claim 1, wherein each of the connecting lines comprises either a string, or a rope, or a metallic wire, or a nylon line, or a chain.

6. The apparatus of claim 1, wherein either,
    the number of vertices is three and the convex polygon is a triangle, or
    the number of vertices is four and the convex polygon is a convex quadrilateral, or
    the number of vertices is five and the convex polygon is a convex pentagon, or
    the number of vertices is six and the convex polygon is a convex hexagon.

7. The apparatus of claim 1, wherein each of the line guiding devices comprises either an eyelet, or a single sheave, or a cooperative arrangement of a plurality of sheaves.

8. The apparatus of claim 1, wherein the line displacement actuators are rigidly disposed on the exterior of the structure, each of the line displacement actuators being located adjacent to the particular line guiding device to which the connecting line that is attached to the line displacement actuator is reeved.

9. An apparatus for positioning and moving an object, comprising:
    a structure that establishes a number of vertices which define an empty three-dimensional (3D) space having the shape of a convex polyhedron, said number being greater than or equal to four;
    the same number of line guiding devices, each of which is disposed at the location of a different one of the vertices;
    the same number of line displacement actuators; and
    the same number of connecting lines, wherein,
    one end of each of the connecting lines is attached to a different one of the line displacement actuators,
    each of the connecting lines is reeved to a different one of the line guiding devices,
    the other end of each of the connecting lines is attached to the object,
    each of the line displacement actuators is selectively operated to displace the connecting line that is attached thereto in a controlled manner in order to achieve a desired positioning or movement of the object within the 3D space, and
    each of the line displacement actuators maintains a prescribed amount of tension on the connecting line that is attached thereto when said line is being displaced, and when the displacement of said line is fixed, and wherein
    the line displacement actuators operate under the centralized control of an actuator controller which coordinates the operation of said actuators to achieve the desired positioning or movement of the object,
    each of the line displacement actuators comprises a motor and a tension controlling mechanism,
    the motor is configured to drive the connecting line that is attached to the line displacement actuator in a controlled manner in order to achieve a desired displacement of said line,
    the motor operates in a variety of modes comprising a line retraction mode which retracts said line a desired amount when an appropriate control signal is received from the actuator controller an extension mode which extends said line another desired amount when another appropriate control signal is received from the actuator controller, and a steady state mode which prevents said line from being displaced, and
    the tension controlling mechanism is configured to maintain the prescribed amount of tension on said line when the motor is operating in the variety of modes.

10. The apparatus of claim 9, wherein the actuator controller comprises a computing device.

11. The apparatus of claim 9, wherein the motor comprises either a servomotor or a stepper motor.

12. The apparatus of claim 9, wherein the tension controlling mechanism comprises either a torque motor or a clutch.

13. The apparatus of claim 9, wherein each of the connecting lines comprises either a string, or a rope, or a metallic wire, or a nylon line, or a chain.

14. The apparatus of claim 9, wherein either, the convex polyhedron is a convex pyramid, or the number of vertices is an even number greater than or equal to six and the convex polyhedron is a convex prism, or the number of vertices is 20 and the convex polyhedron is a convex dodecahedron.

15. The apparatus of claim 9, wherein each of the line guiding devices comprises either an eyelet, or a single sheave, or a cooperative arrangement of a plurality of sheaves.

16. The apparatus of claim 9, wherein the line displacement actuators are rigidly disposed on the exterior of the structure, each of the line displacement actuators being located adjacent to the particular line guiding device to which the connecting line that is attached to the line displacement actuator is reeved.

17. An apparatus for positioning and moving an object, comprising:

a number of longitudinal support members, said support members establishing the lateral edges of an empty three-dimensional (3D) space having the shape of a convex prism and also partially establishing the corresponding lateral faces of the 3D space, said number being greater than or equal to three;

the same number of upper line guiding devices, each of which is disposed on a different one of said support members;

the same number of lower line guiding devices, each of which is disposed on a different one of said support members beneath the upper line guiding device that is disposed thereon;

line displacement actuators comprising the same number of upper line displacement actuators and the same number of lower line displacement actuators; and connecting lines comprising the same number of upper connecting lines and the same number of lower connecting lines, wherein, one end of each of the upper connecting lines is attached to a different one of the upper line displacement actuators, each of the upper connecting lines is reeved to a different one of the upper line guiding devices, the other end of each of the upper connecting lines is attached to an upper attachment point on the object, each of the upper line displacement actuators is selectively operated to displace the upper connecting line that is attached thereto in a controlled manner in order to achieve a desired positioning or movement of the upper attachment point on the object within the bounds of said lateral faces, each of the upper line displacement actuators maintains a first prescribed amount of tension on the upper connecting line that is attached thereto when said line is being displaced, and when the displacement of said line is fixed, one end of each of the lower connecting lines is attached to a different one of the lower line displacement actuators, each of the lower connecting lines is reeved to a different one of the lower line guiding devices, the other end of each of the lower connecting lines is attached to a lower attachment point on the object, each of the lower line displacement actuators is selectively operated to displace the lower connecting line that is attached thereto in a controlled manner in order to achieve a desired positioning or movement of the lower attachment point on the object within the bounds of said lateral faces, and each of the lower line displacement actuators maintains a second prescribed amount of tension on the lower connecting line that is attached thereto when said line is being displaced, and when the displacement of said line is fixed, and wherein the line displacement actuators operate under the centralized control of an actuator controller, the actuator controller coordinates the operation of the upper line displacement actuators to achieve the desired positioning or movement of the upper attachment point on the object, the actuator controller also coordinates the operation of the lower line displacement actuators to achieve the desired positioning or movement of the lower attachment point on the object, each of the line displacement actuators comprises a motor and a tension controlling mechanism, the motor is configured to drive the connecting line that is attached to the line displacement actuator in a controlled manner in order to achieve a desired displacement of said line, the motor operates in a variety of modes comprising a line retraction mode which retracts said line a desired amount when an appropriate control signal is received from the actuator controller, an extension mode which extends said line another desired amount when another appropriate control signal is received from the actuator controller, and a steady state mode which prevents said line from being displaced; and the tension controlling mechanism is configured to maintain either the first prescribed amount of tension or the second prescribed amount of tension on said line when the motor is operating in the variety of modes.

18. The apparatus of claim 17, wherein either the first prescribed amount of tension is the same as the second prescribed amount of tension, or the first prescribed amount of tension is different than the second prescribed amount of tension.

19. The apparatus of claim 17, wherein the actuator controller comprises a computing device.

20. The apparatus of claim 17, wherein the motor comprises either a servomotor or a stepper motor.

21. The apparatus of claim 17, wherein the tension controlling mechanism comprises either a torque motor or a clutch.

22. The apparatus of claim 17, wherein each of the connecting lines comprises either a string, or a rope, or a metallic wire, or a nylon line, or a chain.

23. The apparatus of claim 17, wherein either, the number of longitudinal support members is three and the convex prism is a triangular prism, or the number of longitudinal support members is four and the convex prism is a cuboid, or the number of longitudinal support members is five and the convex prism is a pentagonal prism, or the number of longitudinal support members is six and the convex prism is a hexagonal prism.

24. The apparatus of claim 17, wherein each of the upper line guiding devices and each of the lower line guiding devices comprises either an eyelet, or a single sheave, or a cooperative arrangement of a plurality of sheaves.

25. The apparatus of claim 17, wherein, each of the upper line displacement actuators is rigidly disposed on the longitudinal support member on which the particular upper line guiding device to which the upper connecting line that is attached to the upper line displacement actuator is reeved, said actuator being located adjacent to said line guiding device, and each of the lower line displacement actuators is rigidly disposed on the longitudinal support member on which the particular lower line guiding device to which the lower connecting line that is attached to the lower line displacement actuator is reeved, said actuator being located adjacent to said line guiding device.

* * * * *